(12) United States Patent
Webb et al.

(10) Patent No.: US 8,761,747 B2
(45) Date of Patent: Jun. 24, 2014

(54) UNIVERSAL BROWSER

(75) Inventors: Ronald Webb, Plano, TX (US); Joseph R. Cleveland, Murphy, TX (US); Anu Appaji, Plano, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 1059 days.

(21) Appl. No.: 11/796,914

(22) Filed: Apr. 30, 2007

(65) Prior Publication Data

US 2008/0267101 A1   Oct. 30, 2008

(51) Int. Cl.
   *H04M 3/00*   (2006.01)

(52) U.S. Cl.
   USPC ........................................... 455/418

(58) Field of Classification Search
   None
   See application file for complete search history.

(56) References Cited

U.S. PATENT DOCUMENTS

| | | | |
|---|---|---|---|
| 6,996,630 B1* | 2/2006 | Masaki et al. | 709/239 |
| 7,730,199 B2* | 6/2010 | Song et al. | 709/231 |
| 2002/0186680 A1* | 12/2002 | Takagi et al. | 370/349 |
| 2004/0140909 A1* | 7/2004 | Meadows et al. | 340/905 |
| 2006/0068836 A1* | 3/2006 | Nickel | 455/552.1 |
| 2006/0106753 A1* | 5/2006 | Yoon et al. | 707/1 |
| 2006/0149905 A1* | 7/2006 | Park et al. | 711/141 |
| 2006/0181414 A1* | 8/2006 | Bandy et al. | 340/539.22 |
| 2006/0186973 A1* | 8/2006 | Satou | 333/260 |
| 2006/0199541 A1* | 9/2006 | Luebke et al. | 455/41.2 |
| 2007/0162538 A1* | 7/2007 | Kim et al. | 709/200 |
| 2008/0123550 A1* | 5/2008 | Pitis | 370/253 |

FOREIGN PATENT DOCUMENTS

EP   1 199 860 A1   4/2002

OTHER PUBLICATIONS

European Search Report dated Feb. 2, 2012 in connection with European Patent Application No. EP 08 15 5391.
Stefan Dulman, et al., "Architectures for Wireless Sensor Networks", Intelligent Sensors, Sensor Networks and Information Proceedings of the 2005 International Conference on Melbourne, Australia, Dec. 5-8, 2005, p. 31-38.

* cited by examiner

*Primary Examiner* — Olumide T Ajibade Akonai
*Assistant Examiner* — Shantell L Heiber

(57) ABSTRACT

A method, a computer readable medium and a system for universal browsing that comprises, sending a request for a service by a mobile terminal to a service portal, determining a protocol needed to fulfill the request by the service portal, if the protocol needed is resident on the mobile terminal, determining a sensor that can fulfill the request, sending the request by the service portal to the sensor, establishing a connection between the mobile terminal and the sensor, and sending a response to the request to the mobile terminal via the connection.

32 Claims, 15 Drawing Sheets

UNIVERSAL BROWSER

FIELD OF THE DISCLOSURE

The present disclosure is generally related to accessing data from sensor networks, and more particularly to a universal browser for accessing, receiving and/or transmitting data from ubiquitous sensor networks.

BACKGROUND OF THE DISCLOSURE

Recent developments in hardware miniaturization and integration technologies have enabled a new class of embedded systems comprising devices equipped with various sensors that interact with the surrounding environment. These systems are highly decentralized but interconnected via various communication links to form a network. This structure represents a Ubiquitous Sensor Network (USN), which comprises an ambient intelligent environment with an infrastructure based on heterogeneous sensor devices and actuator devices accessible over a wireless or wired network. An ambient intelligent environment is one in which humans are surrounded by computers and networks unobtrusively embedded in their environment. Generally, ambient intelligence assumes ubiquitous computing, unobtrusive hardware that is part of our environment, a seamless communication environment, a distributed network and context awareness of the user. The USN includes sensor nodes that manage real-time information obtained by electronic transducers that sense the surrounding environment and that have the capability to communicate via a display or other electronic data communication mechanisms. Examples of these mechanisms include the following standards: IEEE-488.2, Fieldbus standard2, IEEE 1451, IEEE 802.11, Bluetooth and zigbee.

In a typical USN the data collected and stored by the sensor node is intermittently transferred by other network nodes or sensor nodes toward a static control center, which is referred to as a sink. The main issue associated with this approach is energy usage. Those nodes, which are closest to the sink, will be transferring not only their own data but the data from multiple other sensor nodes toward the sink, thereby using more energy for data transfer.

A mobile terminal may access sensor nodes in a USN. However, users currently utilizing such a mobile terminal would currently receive data only via a pre-programmed, embedded air interface standard with specific data management application software.

Various mobile terminals provide wireless data access using certain standards such as Wireless Fidelity (WiFi) and Bluetooth. These standards can be used to connect to other devices. For example, a mobile terminal can connect to a sensor node via a Bluetooth channel thereby forming a tunnel through which communication can occur or through which communication can be directed to other networks such as the Internet. This approach adds considerable cost and energy consumption to the sensor nodes as well as complexity to the overall network.

Utilizing HyperText Transfer Protocol (HTTP), Simple Object Access Protocol (SOAP), Object Exchange (OBEX) and Internet Protocol version 6 (IPv6) functionality, which are known in the art, the mobile terminal can provide a user with a capability to access and browse different networks. These protocols, however, do not provide the user interface for display of, or utilization of, data from a sensor node. Furthermore, current architectures for data access from a sensor node require that the user access a server. This approach suffers from the need to develop an application that is capable of communicating with devices connected to the server. Dependent on the devices connected, the server must be able to receive, for example, sensor data, configuration data, alarms, and the like. Furthermore, such a server includes hardware that enables such communication capability. As such, a customized access infrastructure must be built, which is a costly and cumbersome process.

Web services are invoked in the mobile terminal protocol stack by means of industry-standard protocols including SOAP, XML, OBEX and HTTP. A Dynamic-Link Library (DLL) is an implementation of a shared library in one operating system. It provides the standard benefits of shared libraries, such as modularity. Modularity allows changes to be made to code and data in a single self-contained DLL shared by several applications without any change to the applications themselves. This basic form of modularity allows for relatively compact patches. Another benefit of the modularity is the use of generic interfaces for plug-ins.

Sensor nodes are typically battery based and as such are very power restricted for data collection, storage and transfer. Access to the data can occur through either the sensor network itself, which is power inefficient for data transfer or for the more energy friendly transfer associated with mobile terminals that collect and sink the sensor node data. In typical USNs the data collected by a sensor node is transferred via other sensor nodes or network nodes to a static control center (sink). Those nodes closest to the sink transfer not only their own data but also the data from sensor nodes that are located at a greater distance from the sink and thus use more energy for the data transfer process. The problem associated with sending data from sensor node to sensor node is that sensor nodes closer to the control center will have to shuttle data from sensor node farther away from the control center to the control center, which consumes far more power. When these closer sensor nodes run out of power the entire network is essentially non-operable.

Therefore, what is needed is a system, method, and computer readable medium that overcomes the limitations and complexities described above.

SUMMARY OF THE DISCLOSURE

The present disclosure provides a universal browser, running or operating on a mobile terminal, that allows data to be accessed, received and/or transmitted via a variety of sensor nodes and air interfaces. The mobile terminal may be a cellular phone, an IP enabled phone, a multimedia phone, a multi-band phone, and any device that can wirelessly transmit and receive information. Such a mobile terminal includes a framework or software stack of the present disclosure that enables utilization of a variety of data types or sensor types over a multitude of air interfaces.

In one embodiment of the disclosure, a method for universal browsing comprises, sending a request for a service by a mobile terminal to a service portal, determining a protocol needed to fulfill the request by the service portal, if the protocol needed is resident on the mobile terminal, determining a sensor that can fulfill the request, sending the request by the service portal to the sensor, establishing a connection between the mobile terminal and the sensor, and sending a response to the request to the mobile terminal via the connection.

In another embodiment of the disclosure, a method for universal browsing comprises, sending a request for a service by a mobile terminal, receiving a protocol needed to fulfill the request, sending the request to a sensor that can fulfill the request, and receiving a response to the request by the mobile terminal.

In yet another embodiment of the disclosure, a computer readable medium comprises instructions for, requesting a packet from a sensor by a protocol stack, downloading a protocol to the protocol stack if the packet cannot be received by the protocol stack, connecting the protocol stack and the sensor, and receiving the packet via the connection.

In still yet another embodiment of the disclosure, a computer readable medium comprises instructions for, identifying a sensor network by a protocol stack on a mobile terminal, determining a port compatible with the sensor network, wherein the port defines a virtual data connection between the sensor network and the mobile terminal, connecting the sensor network and the mobile terminal via the port, modifying the connected port to optimize a transfer rate of a packet and selectively receiving the packet via the protocol stack via the modified port based upon a context defined by a user.

In yet a further embodiment of the disclosure, a system comprises a memory, and a processor communicably coupled to the memory, wherein the processor, detects a sensor network by a mobile terminal, downloads a protocol stack related to the sensor network, downloads a port via the sensor network, connects to the sensor network utilizing the port and the protocol stack, and receives a packet compatible with any protocol on the protocol stack via the sensor network.

In still another embodiment of the disclosure, a method for universal browsing comprises, requesting a service, initiating service discovery of a sensor network in response to the request, determining a context defined by a user of the request, downloading a port to connect to the sensor network based on the request and the context, and receiving a response to the request via the port.

DETAILED DESCRIPTION OF AN EMBODIMENT OF THE DISCLOSURE

Figure 1:
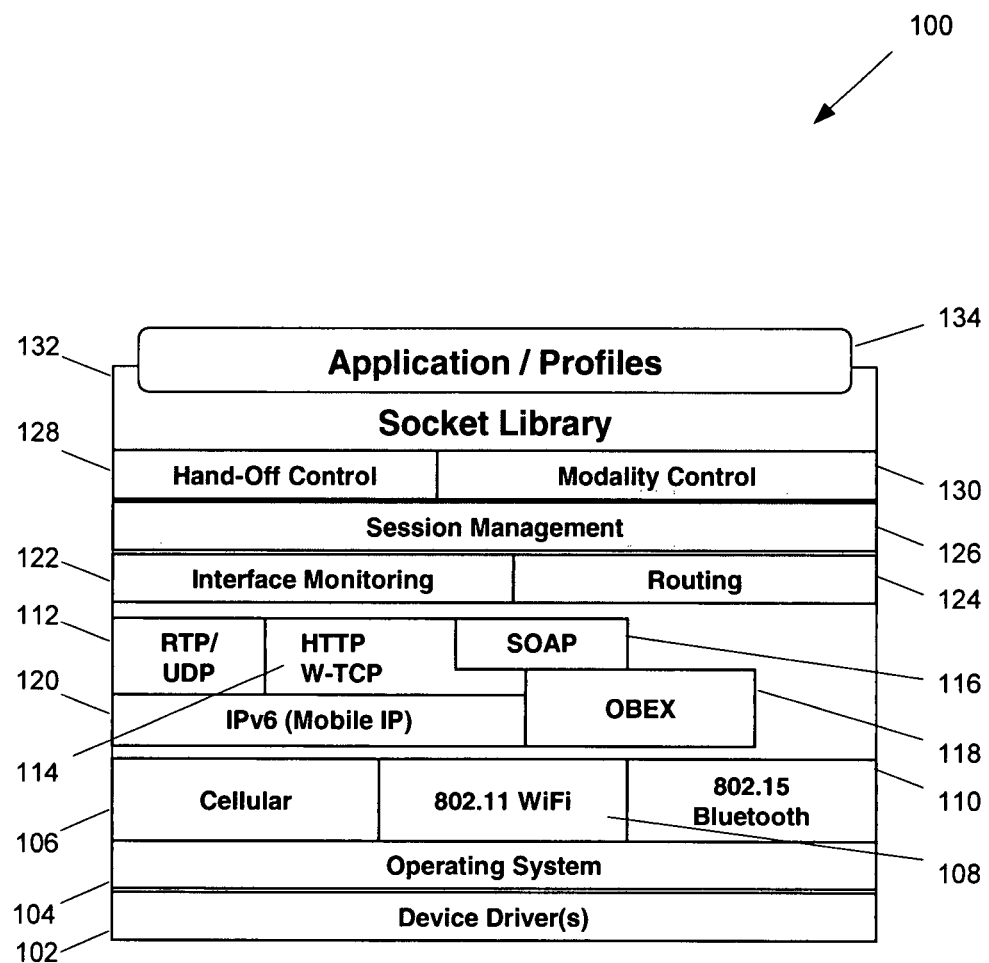
FIG. 1 represents a prior art protocol stack in a mobile terminal supporting wireless protocols.

Referring now to FIG. 1, a prior art protocol stack 100 in a mobile terminal supporting Bluetooth is depicted. The stack 100 is comprised of device drivers 102 interacting with an operating system 104 which is communicably coupled using either cellular 106, Wifi 108 or Bluetooth 110 applications. The protocols that are used are Real Time Transfer Protocol (RTP), User Datagram Protocol (UDP) 112, HyperText Transfer Protocol (HTTP), Wireless Transfer Control Protocol (W-TCP) 114, Simple Object Access Protocol (SOAP) 116, Object Exchange (OBEX) 118, and IPv6 for mobile IP 120. The stack above the protocols is used for interface monitoring 122 and routing 124, and communicating with session management 126. Above session management 126 hand-off control 128 and modality control 130 functionality can be found. Interacting with the control layer is the socket library 132 which interfaces with the applications and profiles 134.

Figure 2:
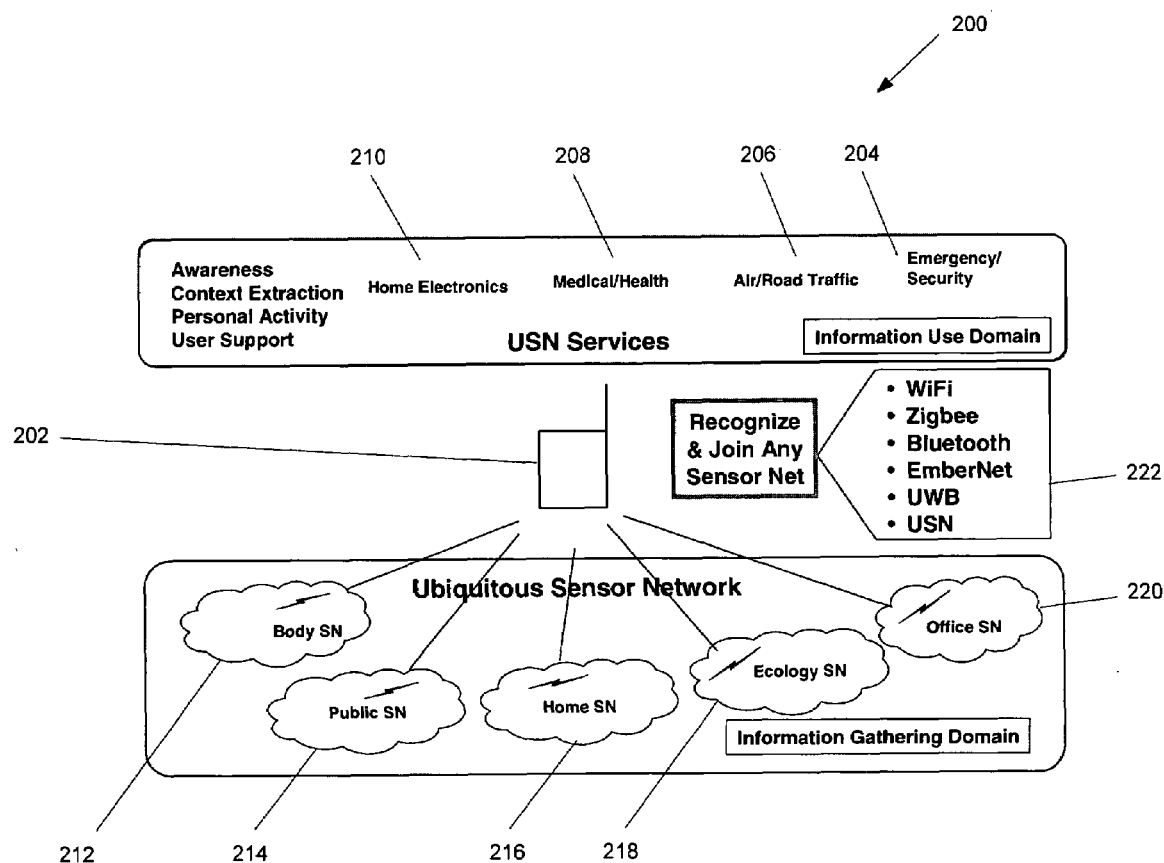
FIG. 2 represents mobile terminal data acquisition from a ubiquitous sensor network in accordance with an embodiment of the disclosure.

Referring now to FIG. 2, mobile terminal data acquisition from a ubiquitous sensor network (USN) 200 is depicted and comprises a number of blocks or modules that are software, hardware, or firmware, and/or the combination of software, hardware, and/or firmware. Mobile terminal 202 enables more energy-efficient data collection use since a mobile collector can directly pick-up or access the data from a sensor instead of having to send the data across an entire sensor network. Also, data collection with a mobile sink is more practical in various USN services or applications such as emergency and security monitoring 204, air and road traffic monitoring 206, medical and health monitoring 208 and home electronics monitoring 210. USNs can transfer data via the sensor node in one of several ways. Power consumption of a sensor node is critical since they are typically battery powered.

A more efficient manner to transfer data is to utilize a mobile collector that intermittently receives data via the sensor node. This mobile collector can either send the data to the control center, which acts as the data sink, or the mobile collector can act as the data sink. Either way, the data transfer power overhead of the sensor nodes is reduced, since the sensor nodes only intermittently transfer data to the mobile collector. These services can be used to provide a user of the mobile terminal 202 information regarding awareness, context extraction, personal activities, user support, and the like. The USN 200 comprises a wide range of sensor networks including decentralized body sensor networks 212, public environmental and health monitoring sensor networks 214, home sensor networks 216, ecology sensor networks 218 and office sensor networks 220. The communications protocols 222 that can be recognized by the mobile terminal 202 and the USN 200 are, for example, WiFi, Zigbee, Bluetooth, Embernet, UWB and USN. Other protocols can be used without departing from the scope of the present disclosure.

Figure 3:
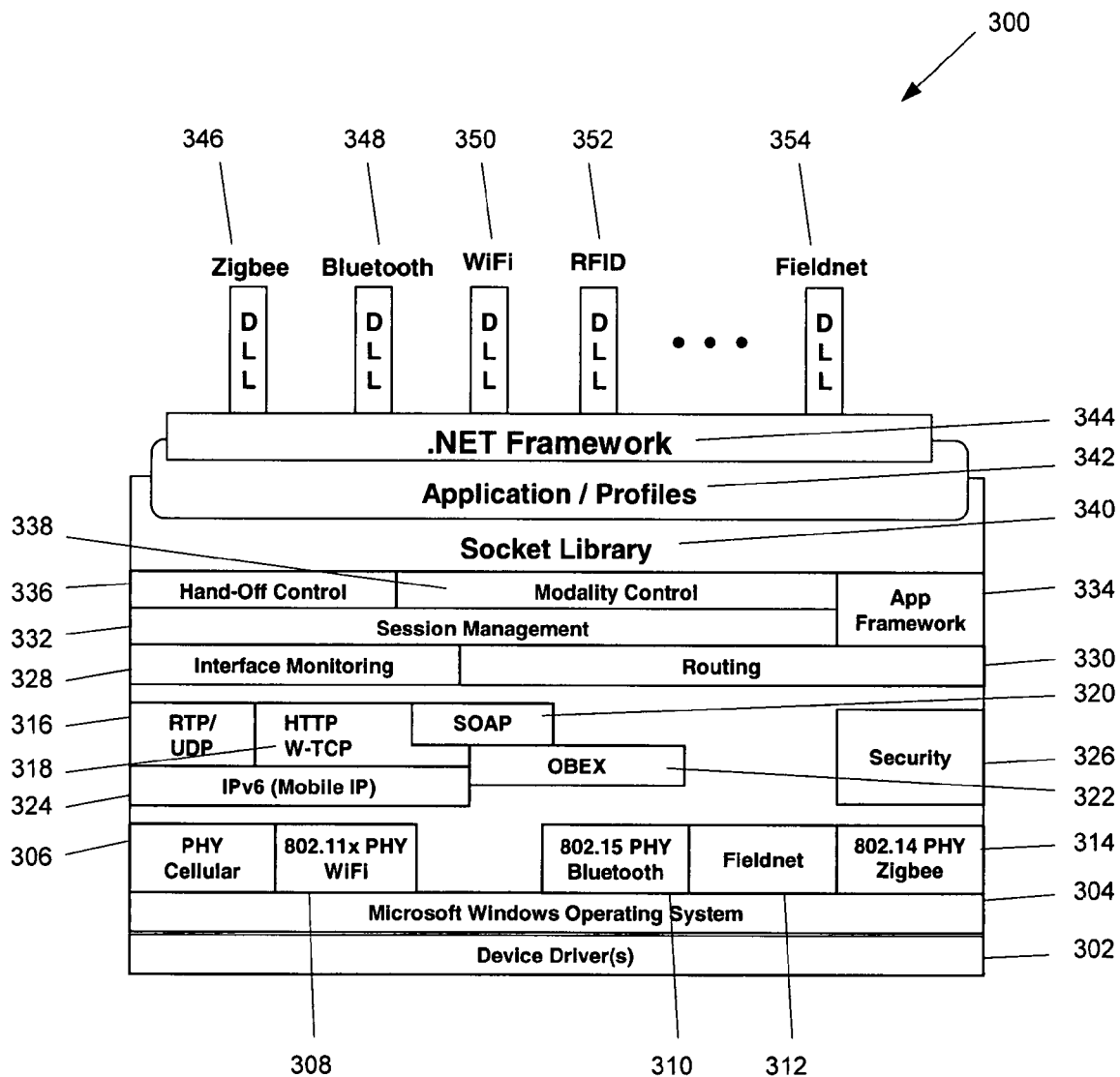
FIG. 3 represents a protocol stack in accordance with an embodiment of the disclosure.

Referring now to FIG. 3, a protocol stack 300 for universal browsing is depicted and comprises a number of blocks or modules that are software, hardware, or firmware, and/or the combination of software, hardware, and/or firmware. At the bottom most layer of the stack are the device drivers 302 communicating through the operating system 304 with the physical layers of cellular 306, WiFi 308, Bluetooth 310, Fieldnet 312 and Zigbee 314. The protocols that are used are RTP/UDP 316, HTTP/W-TCP 318, SOAP 320, OBEX 322, IPv6 for mobile IP 324 and the level has the addition of a security layer 326 which ensures a secure transfer of information to and from the stack 300. Other protocols can be used with the stack 300 and can be dynamically loaded and run. The stack above the transfer protocol is utilized for interface monitoring 328 and routing 330 based on an interface that is found or selected, communicating with session management 332 and application frameworks 334, followed by hand-off control 336 for providing all forms of hand-off and modality control 338 which permits a user of the mobile terminal 202 of FIG. 2, can receive a visual, auditory, or other output from a component in the USN 200, such as a sensor or device, or which permits a component in the USN 200 to receive an input from a user and/or from the mobile terminal 202.

Interacting with the control layer is the socket library 340 that interfaces with the applications and profiles 342 layer. The socket library includes software objects that connect an application to a network protocol. For example, a program can send and receive messages by opening a socket and reading and writing data to and from the socket. The applications and profiles 342 layer interfaces to a framework, such as the NET framework 344 which links to various Dynamic-Link Libraries (DLLs) which are an implementation of shared libraries in an operating system which allow changes to be made to code and data in a single self-contained DLL shared by several applications without any change to the applications themselves. The DLLs include a Zigbee DLL 346, a Bluetooth DLL 348, a WiFi DLL 350, an RFID DLL 352 and a Fieldnet DLL 354, which are used to communicate with sensors and other devices in a USN. Other DLLs may also be used by the stack 300. This stack 300 is preferably embodied in a computer readable medium or software but may also be embodied in firmware and/or hardware. The transfer of information between the stack and the USN occurs via at least one of a wireless protocol, a wired protocol and the combination of the wireless protocol and the wired protocol.

The framework, or protocol stack 300, of FIG. 3 connects information, people, systems, and devices through easily down-loaded software modules using, for example, Microsoft's XML Web Services platform (.NET) technology. Other platforms can be used without departing from the scope of the present disclosure. .NET provides the ability to quickly build, deploy, manage, and use connected, security-enhanced solutions with web services. A web service is a software system that supports machine-to-machine interaction over a network. A web service may be as simple as an application-programming interface that can be accessed over a network such as the Internet and executed on a remote system hosting the requested service. NET-connected solutions enable more rapid integration of components in the mobile terminal in a form familiar to users of web services in a more agile manner.

The framework 300 of the present disclosure permits the building and utilization of all pieces of an application to the utilization of web services created by others. As such, it is not necessary to supply or create every piece of the framework in order to provide a complete solution. The present disclosure provides a single interface that allows old as well as new modules to be integrated seamlessly at run-time, for example, into pre-existing applications, without any modification to the application itself.

One embodiment of the disclosure describes a framework 300 that enables the acquisition and use of data collected from a USN. This framework allows users to access services they want (among numerous services and networks available everywhere in a ubiquitous environment) and uses a sensor network to ascertain a user's context. A user's context is the situational state of the user with respect to the sensor node. Stated another way, the context is the set of data reception preferences that the user selects (i.e. data that is important to the user). A first example context would be sensor network data pertaining to building temperatures for a fireman to locate portions of a building that are on fire. A second example context would be a bodily-embedded blood sugar sensor for a family doctor to monitor how faithfully a patient is watching their diet. A third example context would be a motorist gathering sensor network data on information pertaining to traffic congestion so a traffic jam could be avoided. Context allows a user to accesses a service (for example, resident on a sensor network) and allows the service to be used in the most convenient way.

Figure 4:
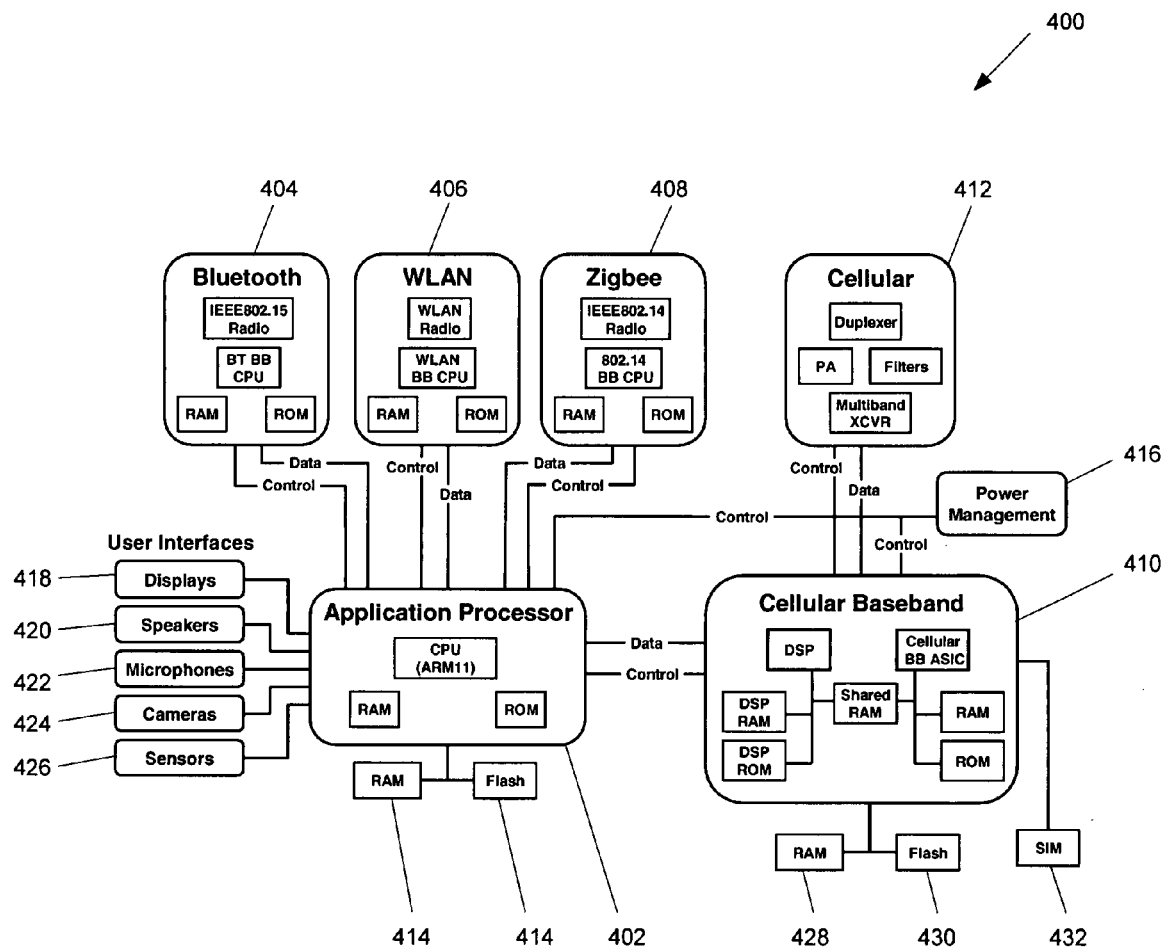
FIG. 4 represents a block diagram of a next generation mobile phone in accordance with an embodiment of the disclosure.

Referring now to FIG. 4, a next generation mobile phone 400, for example a 3G mobile phone, for universal browsing that utilizes a protocol stack such as protocol stack 300, is depicted. The mobile phone 400 comprises a number of blocks or modules that are software, hardware, or firmware, and/or the combination of software, hardware, and/or firmware. The mobile phone 400 is configured to access cellular services (e.g., GSM, WCDMA, 3G 1x, 1xEV-DO, HSDPA, WiMAx, etc.) and other wireless networks such as Bluetooth, zigbee and WiFi. The present disclosure includes a host CPU, located in an application processor 402. The host CPU manages the radio hardware (not shown) while performing the upper layers of protocols and applications for the cellular services and wireless networks described above, as well as for different air and user interfaces, subscriber identity management, user interfaces, battery management and the nonvolatile memory. The previously described NET and .DLL frameworks reside on the host CPU. Additional processing resources can be added to the cellular baseband ASIC and DSP to support the features of the multiple interfaces. Each processor includes its own memory system, for example RAM and Flash. Support for additional wireless networking, such as Bluetooth and WLAN connectivity, can be accomplished by providing additional functions, provided by, for example, radio transceivers, digital basebands, RAM and Flash memory.

The application processor 402, which further includes memory such as Random Access Memory (RAM) and Read Only Memory (ROM), can transmit or receive data from a number of protocols such as Bluetooth 404, WLAN 406 and zigbee 408. The Bluetooth protocol can be performed by a IEEE802.15 compliant radio communicably coupled to a Bluetooth baseband processor which may include RAM and ROM memory. The Bluetooth protocol may interface with the application processor via data and control signals. The Wireless LAN (WLAN) protocol can be performed by a WLAN compliant radio communicably coupled to a WLAN baseband processor which may include RAM and ROM memory. The WLAN protocol may interface with the application processor via data and control signals. The Zigbee protocol can be performed by a IEEE802.14 compliant radio communicably coupled to a IEEE802.14 compliant baseband processor which may include RAM and ROM memory. The Zigbee protocol may interface with the application processor via data and control signals.

The cellular baseband processor 410 utilizes a cellular module 412 to interface with the cellular network. The cellular baseband processor 410 includes a Digital Signal Processor (DSP) and a cellular baseband Application Specific Integrated Circuit (ASIC) communicably coupled to various memories. The cellular module 412 includes a duplexer, a power amplifier, filters, and a multi-band transceiver. The cellular baseband may also have RAM 428 and Flash 430 memory modules coupled to it for extended memory. The cellular baseband processor is additionally coupled to a Subscriber Identity Module (SIM) card 432. A SIM card is a printed circuit board that that identifies the caller to the network service provider. The SIM card contains subscriber details, security information and memory for a personal directory of numbers and stores data.

The application processor 402 has access to additional memory 414 and shares power management functions 416 with the cellular baseband module 410. The application processor 402 interfaces with a number of user interfaces such as one or more displays 418, speakers 420, microphones 422, cameras 424 and sensors 426. The transfer of data and control information between the various modules in the mobile phone 400 occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein preferably form a circuit but in certain situations or applications may not.

The cellular baseband processor 410 digitally modulates signals of a cellular transceiver for cellular communication. The application processor 402 is communicably coupled to the cellular baseband processor 410 and interfaces with various user interfaces such as displays, speakers, microphones, cameras and sensors, and wireless communications devices such as Bluetooth, wireless local area network and Zigbee. The applications processor can communicate with the USN to download information that can be subsequently stored and downloaded via the wireless communications devices or via cellular communication.

A next generation mobile terminal can utilize the protocol stack of the present disclosure to access cellular services such as Global System for Mobile Communications (GSM), Wideband Code Division Multiple Access (WCDMA), 3rd Generation Wireless Format (3G), 1× Evolution-Data Only (1×EV-DO), High-Speed Downlink Packet Access (HSDPA), Worldwide Interoperability for Microwave Access (WiMax) and other wireless networks such as Bluetooth, Zigbee and WiFi. The present disclosure includes a host CPU located in an application processor. The host CPU manages radio hardware while performing the application layer protocols for the cellular services and wireless networks described above, as well as for different air and user interfaces, subscriber identity management, battery management and nonvolatile memory. The previously described NET and .DLL frameworks reside on this host CPU. Additional processing resources can be added to the cellular baseband processor to support the features of the multiple interfaces. Each processor includes its own memory system comprising, for example, RAM and Flash. Support for additional wireless networking, such as Bluetooth and WLAN connectivity, can be accomplished by providing additional functions provided by, for example, radio transceivers, digital basebands, RAM and Flash components.

Figure 5:
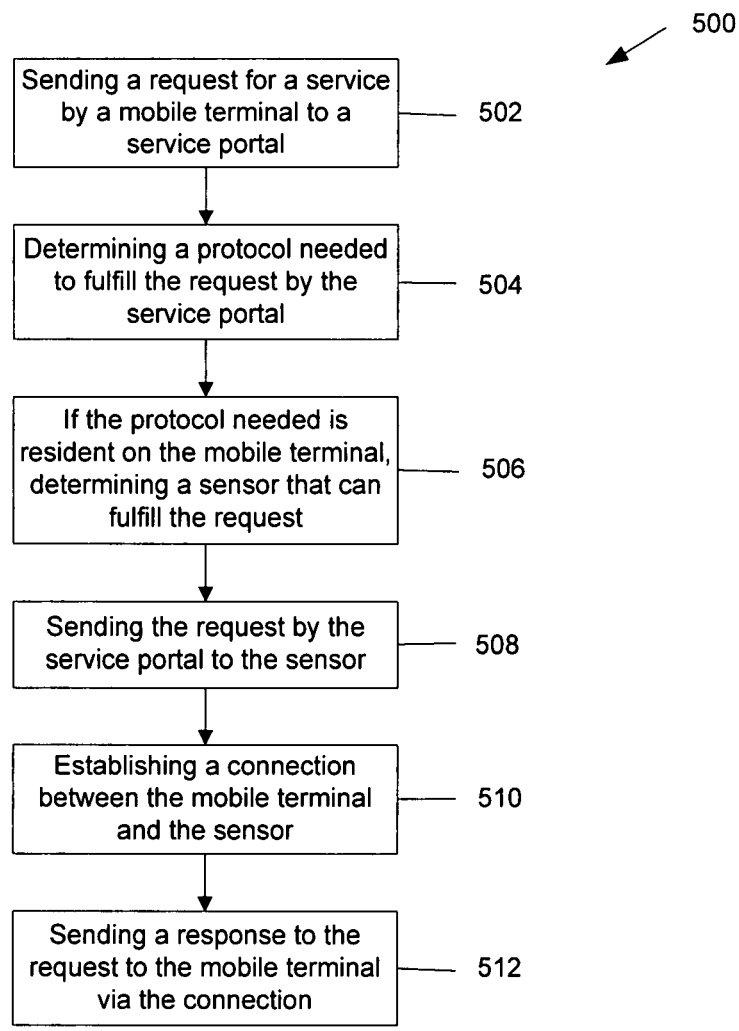
FIG. 5 represents a first method of universal browsing in accordance with an embodiment of the disclosure.

Referring now to FIG. 5, a first method of universal browsing 500 is depicted and comprises, sending 502 a request for a service by a mobile terminal to a service portal, determining 504 a protocol needed to fulfill the request by the service portal, if the protocol needed is resident on the mobile terminal, determining 506 a sensor that can fulfill the request, sending 508 the request by the service portal to the sensor, establishing 510 a connection between the mobile terminal and the sensor, and sending 512 a response to the request to the mobile terminal via the connection. The steps performed in FIG. 5 occur via at least one of: a wireless protocol, a wired protocol, a combination of the wireless protocol and the wired protocol, and via software, hardware, or firmware, and/or the combination of software, hardware, and/or firmware.

Figure 6:
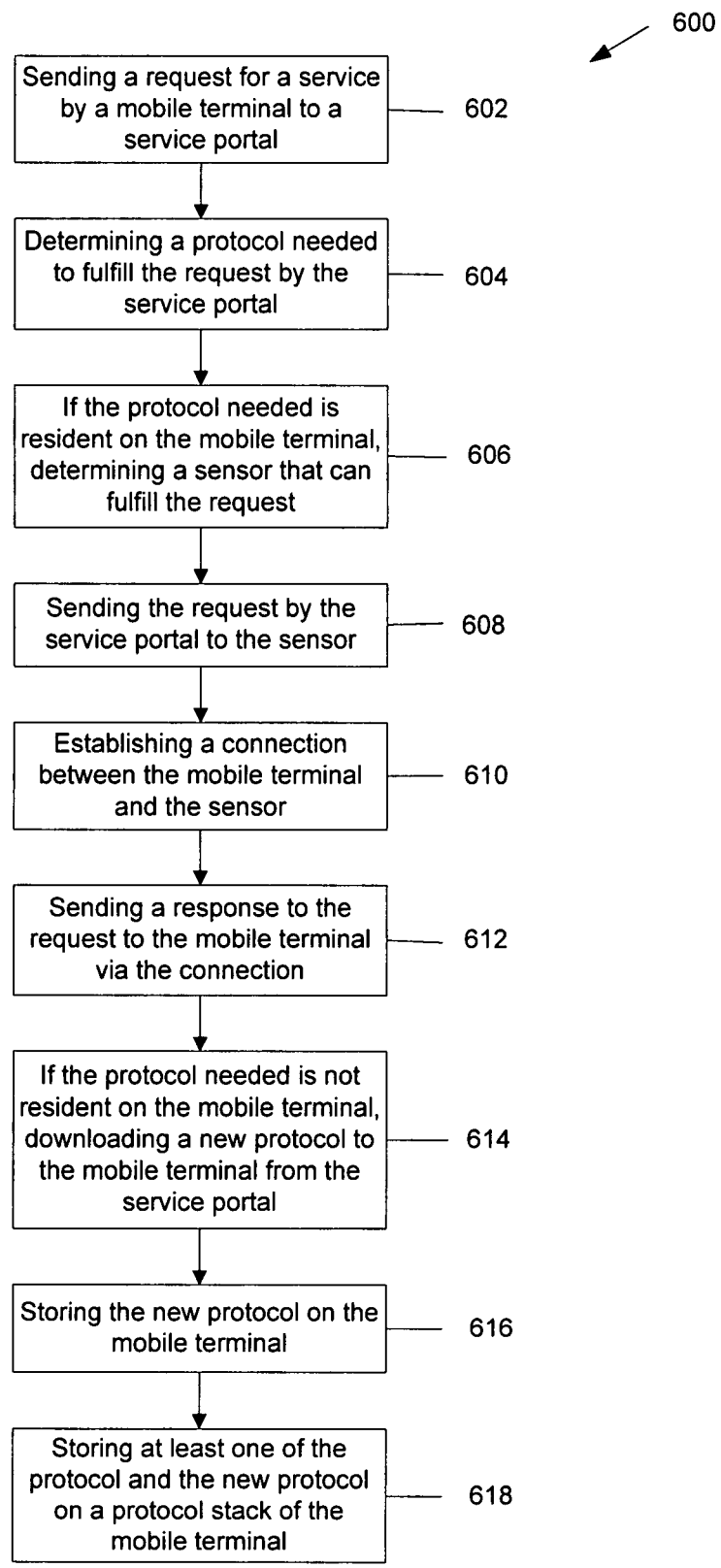
FIG. 6 represents a second method of universal browsing in accordance with an embodiment of the disclosure.

Referring now to FIG. 6, a second method of universal browsing 600 is depicted and comprises, sending 602 a request for a service by a mobile terminal to a service portal, determining 604 a protocol needed to fulfill the request by the service portal, if the protocol needed is resident on the mobile terminal, determining 606 a sensor that can fulfill the request, sending 608 the request by the service portal to the sensor, establishing 610 a connection between the mobile terminal and the sensor, and sending 612 a response to the request to the mobile terminal via the connection. The method may comprise downloading 614 a new protocol to the mobile terminal from the service portal if the protocol needed is not resident on the mobile terminal, storing 616 the new protocol on the mobile terminal and storing 618 at least one of the protocol and the new protocol on a protocol stack of the mobile terminal. Wherein the determining of the protocol to fulfill the request is based on the protocol of the sensor that can fulfill the request, the sensor is a member of a sensor network and the determining of the sensor that can fulfill the request is based on at least one of, a distance between the sensor and the mobile terminal, a signal strength between the sensor and the mobile terminal, information stored by the sensor, and information that can be retrieved by the sensor, wherein the information is related to the response. If more than one protocol can fulfill the request, determining by the service portal a most efficient protocol to fulfill the request. Wherein the determining the most efficient protocol is based upon an energy usage needed to fulfill the request, the determining the energy usage is based upon at least one of, a number of hops between the sensor and the mobile terminal, and a distance between the hops. The determining the most efficient protocol is based upon a time delay to fulfill the request. The steps performed in FIG. 6 occur via at least one of: a wireless protocol, a wired protocol, a combination of the wireless protocol and the wired protocol, and via software, hardware, or firmware, and/or the combination of software, hardware, and/or firmware.

Figure 7:
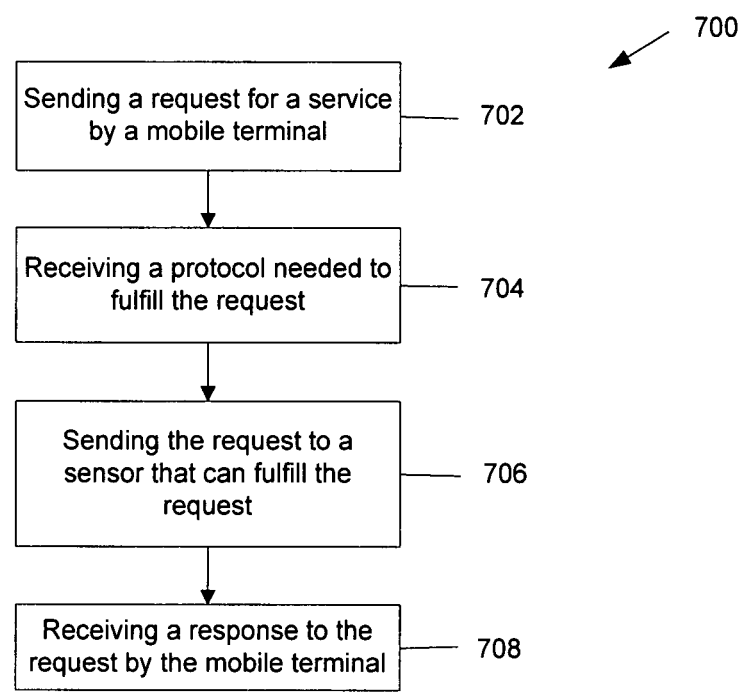
FIG. 7 represents a third method of universal browsing in accordance with an embodiment of the disclosure.

Referring now to FIG. 7, a third method of universal browsing 700 is depicted and comprises, sending 702 a request for a service by a mobile terminal, receiving 704 a protocol needed to fulfill the request, sending 706 the request to a sensor that can fulfill the request, and receiving 708 a response to the request by the mobile terminal. The steps performed in FIG. 7 occur via at least one of: a wireless protocol, a wired protocol, a combination of the wireless protocol and the wired protocol, and via software, hardware, or firmware, and/or the combination of software, hardware, and/or firmware.

Figure 8:
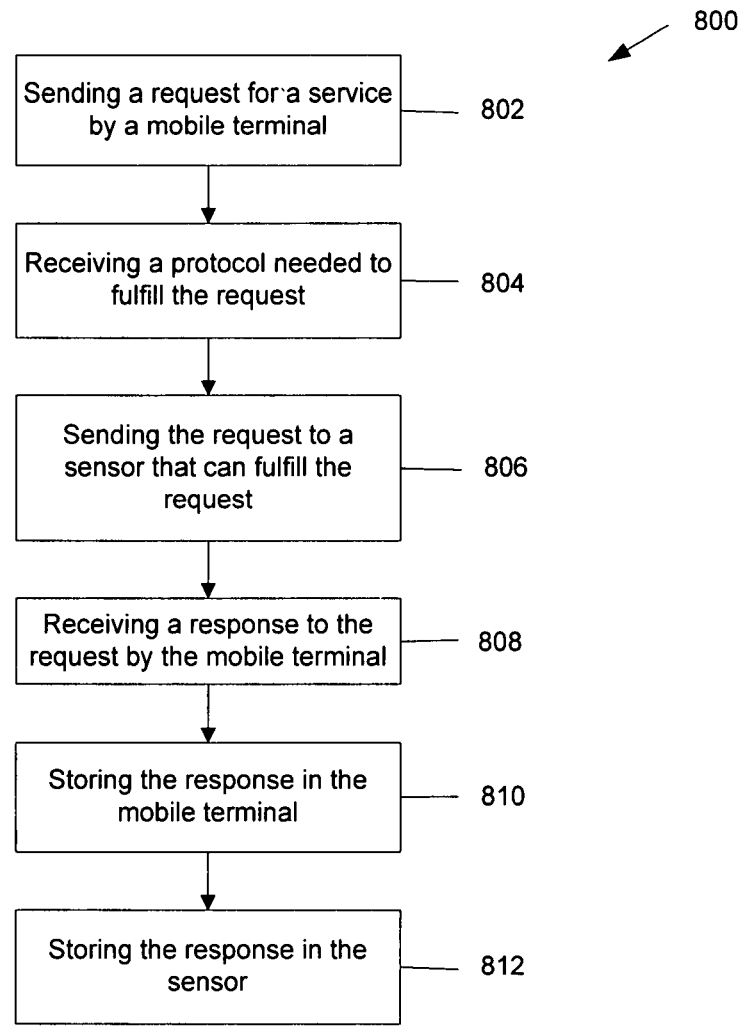
FIG. 8 represents a fourth method of universal browsing in accordance with an embodiment of the disclosure.

Referring now to FIG. 8, a fourth method of universal browsing 800 is depicted and comprises, sending 802 a request for a service by a mobile terminal, receiving 804 a protocol needed to fulfill the request, sending 806 the request to a sensor that can fulfill the request, and receiving 808 a response to the request by the mobile terminal. Wherein the receiving of the protocol is performed by intermittently polling for the protocol resident on the mobile terminal and the receiving of the response is selectively based upon a context defined by a user, wherein the user utilizes the mobile terminal. The method may comprise storing 810 the response in the mobile terminal and storing 812 the response in the sensor. Wherein the sensor is a member of a sensor network, wherein the sensor network is at least one of, a fixed sensor network, a mobile sensor network, and a fixed and mobile sensor network. The steps performed in FIG. 8 occur via at least one of: a wireless protocol, a wired protocol, a combination of the wireless protocol and the wired protocol, and via software, hardware, or firmware, and/or the combination of software, hardware, and/or firmware.

Figure 9:
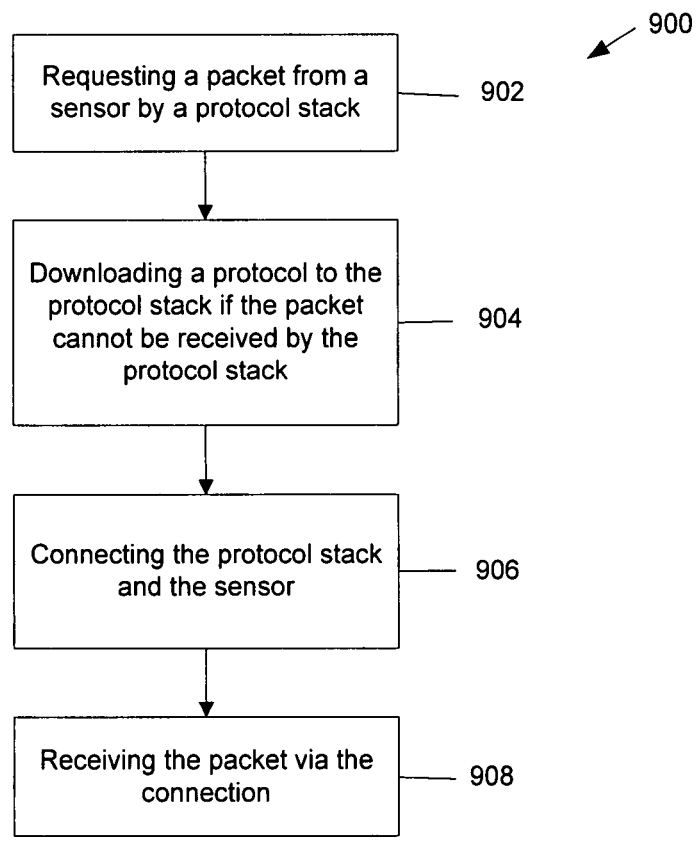
FIG. 9 represents a first computer readable media of universal browsing in accordance with an embodiment of the disclosure.

Referring now to FIG. 9, a first software flow diagram 900 of universal browsing is depicted. A computer readable medium, or software, comprises instructions for, requesting 902 a packet from a sensor by a protocol stack, downloading 904 a protocol to the protocol stack if the packet cannot be received by the protocol stack, connecting 906 the protocol stack and the sensor, and receiving 908 the packet via the connection. Wherein the requesting of the packet is received by a module, wherein the module is at least one of, a service portal, a sensor, and another mobile terminal. The protocol may be at least one of WiFi, WiMax, zigbee, Bluetooth, Fieldnet and RFID. The receiving of the packet is selectively based upon a context defined by a user, the connection allows transfer of the packet between the sensor network and the mobile terminal to occur in at least one of real time and near real time. The packet includes at least one of, static data, dynamic data, text data, multimedia data, images, voice data and video. The steps performed in FIG. 9 occur via at least one of: a wireless protocol, a wired protocol and a combination of the wireless protocol and the wired protocol.

Figure 10:
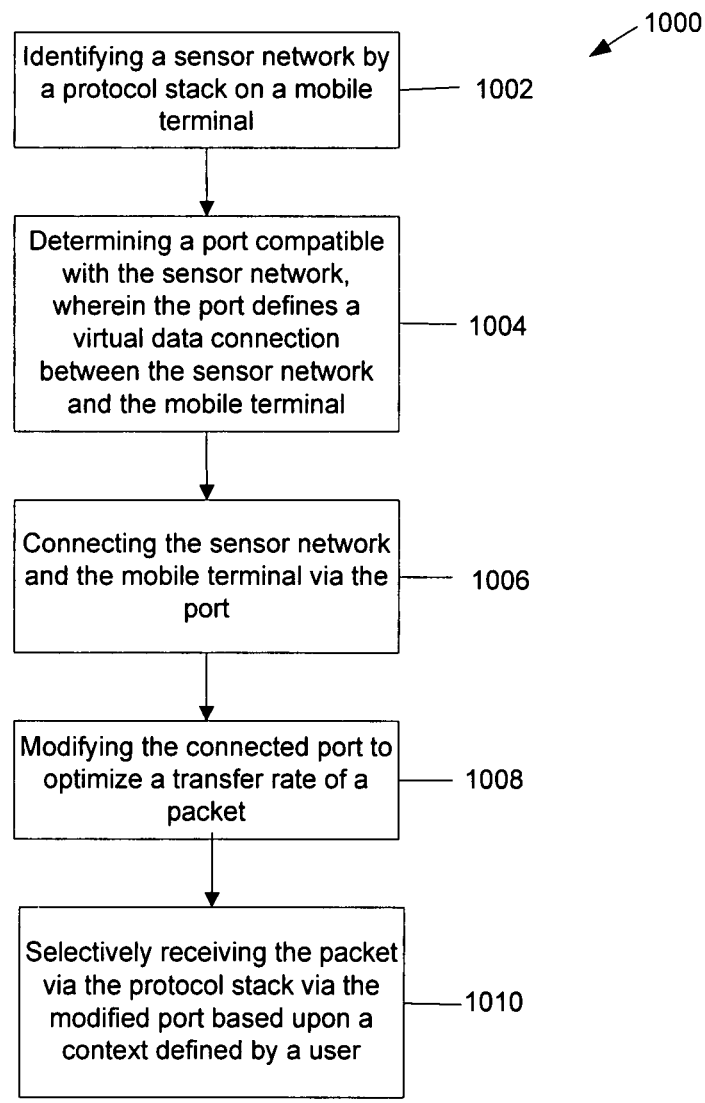
FIG. 10 represents a second computer readable media of universal browsing in accordance with an embodiment of the disclosure.

Referring now to FIG. 10, a second software flow diagram 1000 of universal browsing is depicted. A computer readable medium, or software, comprises instructions for, identifying 1002 a sensor network by a protocol stack on a mobile terminal, determining 1004 a port compatible with the sensor network, wherein the port defines a virtual data connection between the sensor network and the mobile terminal, connecting 1006 the sensor network and the mobile terminal via the port, modifying 1008 the connected port to optimize a transfer rate of a packet and selectively receiving 1010 the packet via the protocol stack via the modified port based upon a context defined by a user. The mobile terminal to USN connection is referred to as a port. The port may be the virtual address or the physical address which specify the specific location of data transfer between the sensor network and the mobile terminal. The computer readable medium modification of the linked port is performed to maximize a received signal strength from the sensor network. The steps performed in FIG. 10 occur via at least one of: a wireless protocol, a wired protocol and the combination of the wireless protocol and the wired protocol.

Figure 11:
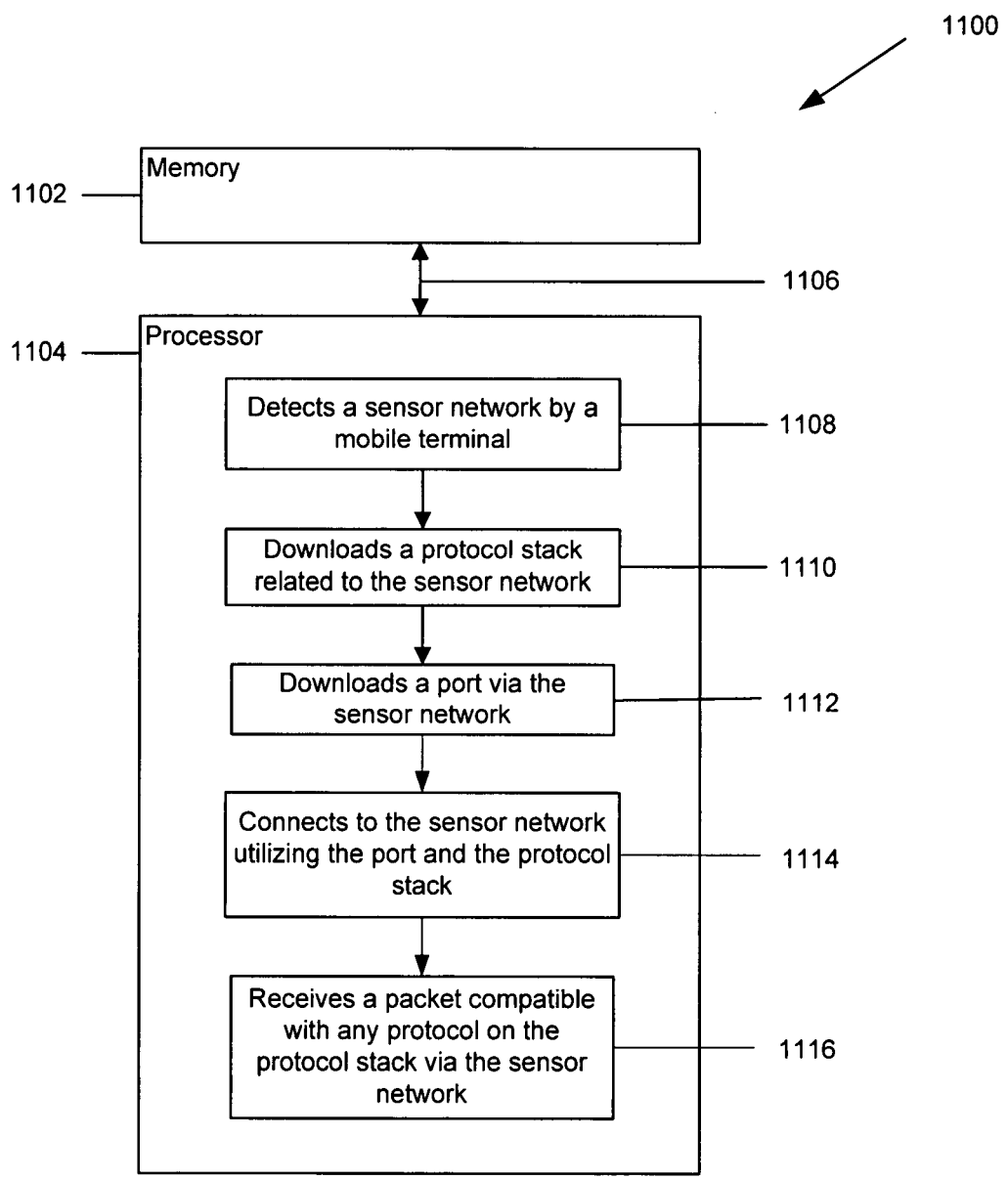
FIG. 11 represents a first system of universal browsing in accordance with an embodiment of the disclosure.

Referring now to FIG. 11, a first system 1100 of universal browsing is depicted and comprises, a memory 1102, and a processor 1104 communicably coupled 1106 to the memory, wherein the processor, detects 1108 a sensor network by a mobile terminal, downloads 1110 a protocol stack related to the sensor network, downloads 1112 a port via the sensor network, connects 1114 to the sensor network utilizing the port and the protocol stack, and receives 1116 a packet compatible with any protocol on the protocol stack via the sensor network. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein preferably form a circuit but in certain situations or applications may not.

Figure 12:
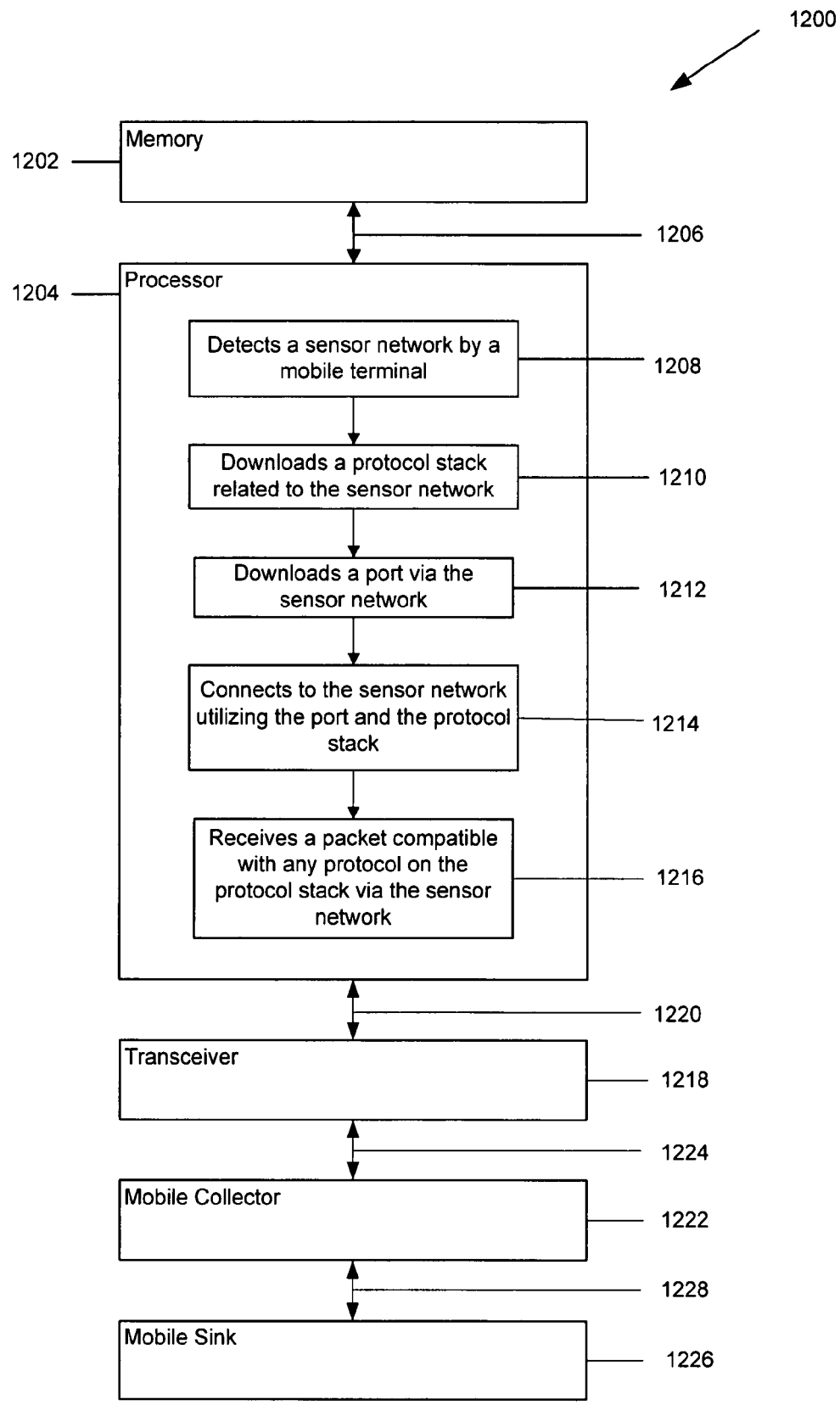
FIG. 12 represents a second system of universal browsing in accordance with an embodiment of the disclosure.

Referring now to FIG. 12, a second system 1200 of universal browsing is depicted and comprises, a memory 1202, and a processor 1204 communicably coupled 1206 to the memory, wherein the processor, detects 1208 a sensor network by a mobile terminal, downloads 1210 a protocol stack related to the sensor network, downloads 1212 a port via the sensor network, connects 1214 to the sensor network utilizing the port and the protocol stack, and receives 1216 a packet compatible with any protocol on the protocol stack via the sensor network. The system may comprise a transceiver 1218 communicably coupled 1220 to the processor and a mobile collector 1222 communicably coupled 1224 to the transceiver. Wherein the transceiver receives a request from the mobile collector and transmits the packet to the mobile collector based upon the request, and the mobile collector stores the packet. The system may comprise a mobile sink 1226 communicably coupled 1228 to the mobile collector for uploading the packet from the mobile collector. The mobile collector selectively transfers the packet to the mobile sink. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein preferably form a circuit but in certain situations or applications may not.

Figure 13:
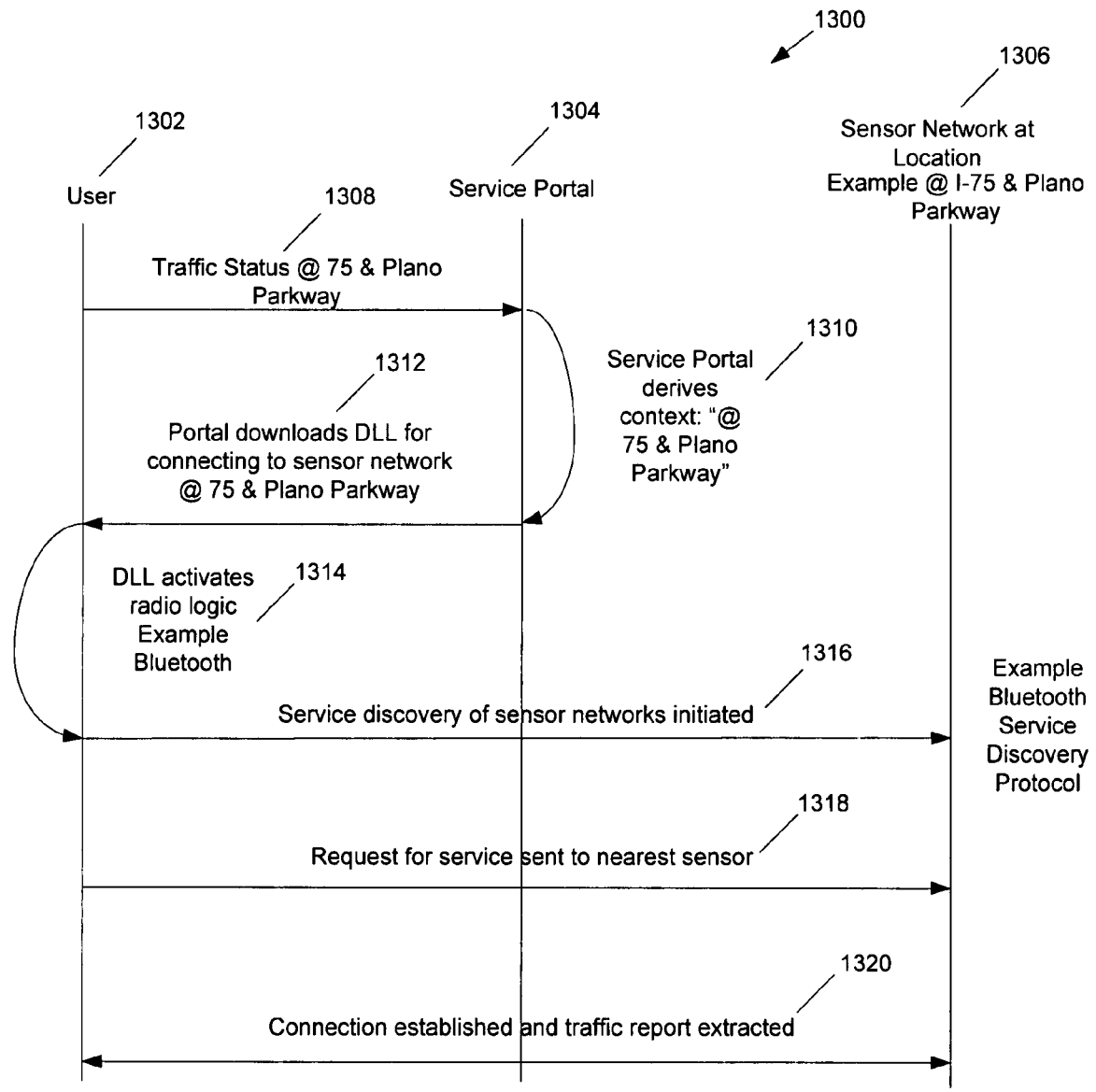
FIG. 13 represents an event and message flow of universal browsing in accordance with an embodiment of the disclosure.

Referring now to FIG. 13, events and messages for universal browsing 1300 are depicted and comprise a number of blocks or modules that are software, hardware, or firmware, and/or the combination of software, hardware, and/or firmware. In this example, a user wants to access a traffic situation at a particular intersection. In order to do so, the user utilizes a service portal offering access to various services such as a traffic congestion report. According to an embodiment of the present disclosure, the user 1302 interacts with the service portal 1304, which is communicably connected to the sensor network 1306, which in this example, is located at I-75 and Plano Parkway. A query 1308 is sent regarding the traffic status at that location, the service portal 1304 derives 1310 the context of the query and downloads 1312 the DLL for connecting to the sensor network 1306 at that location. The DLL activates 1314 radio logic and a service discovery of the sensor network is initiated 1316. A request 1318 for service is sent to the nearest sensor at that location and a connection is established 1320 with the nearest sensor whereby the traffic congestion report is extracted.

Figure 14:
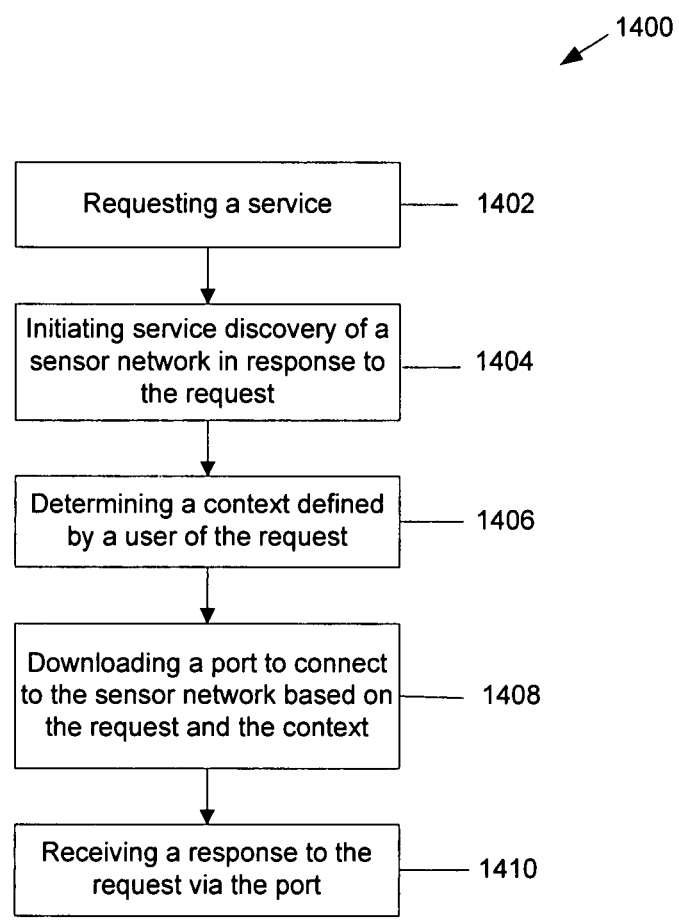
FIG. 14 represents a fifth method of universal browsing in accordance with an embodiment of the disclosure.

Referring now to FIG. 14, a fifth method of universal browsing 1400 is depicted and comprises requesting 1402 a service, initiating 1404 service discovery of a sensor network in response to the request, determining 1406 a context defined by a user of the request, downloading 1408 a port to connect to the sensor network based on the request and the context, and receiving 1410 a response to the request via the port. The steps performed in FIG. 14 occur via at least one of: a wireless protocol, a wired protocol and a combination of the wireless protocol and the wired protocol and via software, hardware, or firmware and/or the combination of software, hardware and firmware.

Figure 15:
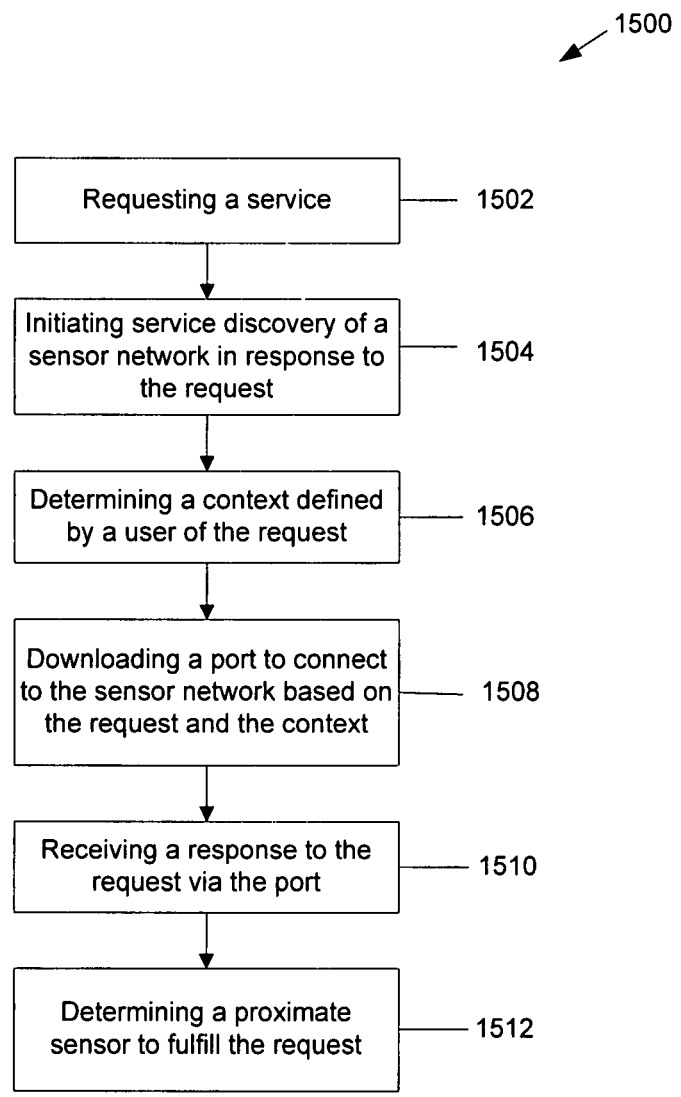
FIG. 15 represents a sixth method of universal browsing in accordance with an embodiment of the disclosure.

Referring now to FIG. 15, a sixth method of universal browsing 1500 is depicted and comprises requesting 1502 a service, initiating 1504 service discovery of a sensor network in response to the request, determining 1506 a context defined by a user of the request, downloading 1508 a port to connect to the sensor network based on the request and the context, and receiving 1510 a response to the request via the port. Wherein the context comprises a set of user preferences. The method may comprise determining 1512 a proximate sensor to fulfill the request, wherein the port specifies a virtual data connection to the sensor network. The steps performed in FIG. 15 occur via at least one of: a wireless protocol, a wired protocol and a combination of the wireless protocol and the wired protocol and via software, hardware, or firmware and/or the combination of software, hardware and firmware.

Systems, methods, devices and computer readable media have been shown and/or described in the above embodiments for universal browsing. Although the above descriptions set forth preferred embodiments, it will be understood that there is no intent to limit the embodiment of the disclosure by such disclosure, but rather, it is intended to cover all modifications and alternate implementations falling within the spirit and scope of the embodiment of the disclosure. Further, the embodiments are intended to cover capabilities and concepts whether they be via a loosely coupled set of components or they be converged into one or more integrated components, devices, circuits, and/or software programs.

What is claimed is:

1. A method for universal browsing, comprising:
    sending, by a mobile terminal to a service portal, a request for a traffic status service at a specified location, the request used to determine a protocol associated with a traffic sensor network at the specified location capable of fulfilling the request;
    receiving, at the mobile terminal, a dynamic link library (DLL) associated with the traffic sensor network protocol from the service portal and storing the DLL in a framework of the mobile terminal;
    determining, by the mobile terminal, a traffic sensor in the traffic sensor network that can fulfill the traffic status service request based on a sensor location that is closest to the specified location;
    establishing a connection directly between the mobile terminal and the traffic sensor; and
    receiving, at the mobile terminal, a response to the request via the connection.

2. The method of claim 1, wherein the framework of the mobile terminal supports web services.

3. The method of claim 2, further comprising:
    storing the protocol on a protocol stack of the mobile terminal.

4. The method of claim 1, wherein the framework of the mobile terminal comprises a .NET framework coupled to a plurality of dynamic link libraries (DLLs).

5. The method of claim 1, wherein the determining of the protocol to fulfill the request is based on the protocol of the sensor that can fulfill the request.

6. The method of claim 1, wherein the determining of the traffic sensor that can fulfill the request is further based on at least one of:
    a signal strength between the traffic sensor and the mobile terminal; and
    information that can be retrieved by the traffic sensor, wherein the information is related to the response.

7. The method of claim 1, wherein if more than one protocol can fulfill the request, determining by the service portal a most efficient protocol to fulfill the request.

8. The method of claim 7, wherein the determining the most efficient protocol is based upon an energy usage needed to fulfill the request.

9. The method of claim 8, wherein determining the energy usage is based upon at least one of:
    a number of hops between the sensor and the mobile terminal; and
    a distance between the hops.

10. The method of claim 7, wherein the determining the most efficient protocol is based upon a time delay to fulfill the request.

11. A method of universal browsing, comprising:
    sending a request for a traffic status service at a specified location by a mobile terminal, the request used to determine a protocol associated with a traffic sensor network at the specified location capable of fulfilling the request;
    receiving from a service portal a dynamic link library (DLL) associated with the protocol;
    storing the DLL in a framework of the mobile terminal;
    sending the traffic status service request to a traffic sensor in the traffic sensor network that can fulfill the request, the traffic sensor determined based on a sensor location that is closest to the specified location; and
    receiving a response to the request by the mobile terminal.

12. The method of claim 11, wherein the receiving of the protocol is performed by intermittently polling for the protocol resident on the mobile terminal.

13. The method of claim 11, wherein the receiving of the response is selectively based upon a context defined by a user, wherein the user utilizes the mobile terminal.

14. The method of claim 11, further comprising:
    storing the response in the mobile terminal.

15. The method of claim 11, further comprising:
    storing the response in the sensor.

16. The method of claim 11, wherein the traffic sensor network is at least one of:
    a fixed sensor network;
    a mobile sensor network; and
    a fixed and mobile sensor network.

17. A computer program product comprising a non-transitory machine-readable medium encoded with computer-executable instructions that when executed cause a data processing system to perform:
    receiving a request for a traffic status service at a specified location from a mobile terminal, the request used to determine a protocol used by a traffic sensor network at the specified location capable of fulfilling the request;
    initiating service discovery of the traffic sensor network in response to the traffic status service request;
    determining a location context defined by a user of the request, the context configured to be used by the mobile terminal to determine a traffic sensor in the traffic sensor network that can fulfill the traffic status service request based on a sensor location that is closest to the specified location;
    providing a dynamic link library (DLL) associated with the protocol used by the traffic sensor network to the mobile terminal, the DLL configured to be stored in a framework of the mobile terminal;
    directly connecting the mobile terminal and the sensor; and
    communicating the traffic status service via the connection.

18. The computer program product of claim 17 wherein the protocol is at least one of: WiFi, WiMax, Zigbee, Bluetooth, Fieldnet, and RFID.

19. The computer program product of claim 17 wherein:
    the connection allows communication of the traffic status service between the sensor network and the mobile terminal to occur in at least one of real time and near real time.

20. The computer program product of claim 17 wherein the traffic status service includes at least one of: static data, dynamic data, text data, multimedia data, images, voice data, and video.

21. A computer program product comprising a non-transitory machine-readable medium encoded with computer-executable instructions that when executed cause a data processing system to perform:
  sending a traffic status service request for a specified location to a service portal, the request used to determine a protocol associated with a traffic sensor network at the specified location capable of fulfilling the request;
  receiving a dynamic link library (DLL) associated with the traffic sensor network protocol from the service portal and storing the DLL in a framework on a protocol stack on a mobile terminal;
  detemiining a traffic sensor in the traffic sensor network that can fulfill the traffic status service request based on a sensor location that is closest to the specified location;
  determining a port compatible with the sensor network, wherein the port defines a virtual data connection between the traffic sensor network and the mobile terminal;
  connecting the mobile terminal directly to the sensor in the traffic sensor network via the port;
  modifying the connected port to optimize a transfer rate of a packet; and
  selectively receiving the packet via the protocol stack via the modified port based upon a context defined by a user.

22. The computer program product of claim 21, wherein the modification of the connected port is performed to maximize a received signal strength from the sensor network.

23. A system for universal browsing comprising:
  a memory; and
  a processor communicably coupled to the memory, wherein the processor is configured to:
    send a request for a traffic status service at a specified location to a service portal, the request used to determine a protocol associated with a traffic sensor network at the specified location capable of fulfilling the request;
    receive from the service portal a dynamic link library (DLL) related to the traffic sensor network and store the DLL in a framework on a protocol stack on the system;
    download a port via the sensor network;
    directly connect a mobile terminal to a traffic sensor in the traffic sensor network that can fulfill the traffic status service request utilizing the port and the protocol stack, the traffic sensor determined based on a sensor location that is closest to the specified location; and
    receive a packet compatible with any protocol on the protocol stack via the traffic sensor network.

24. The system of claim 23, further comprising:
a transceiver communicably coupled to the processor.

25. The system of claim 24, further comprising:
a mobile collector communicably coupled to the transceiver.

26. The system of claim 25, wherein the transceiver receives a request from the mobile collector and transmits the packet to the mobile collector based upon the request.

27. The system of claim 25, wherein the mobile collector stores the packet.

28. The system of claim 25, further comprising:
a mobile sink communicably coupled to the mobile collector and configured to upload the packet from the mobile collector.

29. The system of claim 28, wherein the mobile collector selectively transfers the packet to the mobile sink.

30. A method for universal browsing comprising:
  receiving, at a service portal, a traffic status service request for a specified location from a mobile terminal, the request used to determine a protocol used by a traffic sensor network at the specified location capable of fulfilling the request;
  initiating, at the service portal, service discovery of the traffic sensor network in response to the traffic status service request;
  determining, at the service portal, a location context defined by a user of the request; and
  providing, by the service portal, a dynamic link library (DLL) used by the traffic sensor network to the mobile terminal, the DLL configured to be stored in a framework of the mobile terminal,
  wherein the location context is configured to be used by the mobile terminal to determine a traffic sensor in the traffic sensor network that can fulfill the traffic status service request based on a sensor location that is closest to the specified location.

31. The method of claim 30, further comprising:
determining a traffic sensor to fulfill the request.

32. The method of claim 30, wherein the port specifies a virtual data connection to the traffic sensor network.

* * * * *